United States Patent
Chopra et al.

(10) Patent No.: US 12,346,220 B2
(45) Date of Patent: *Jul. 1, 2025

(54) SYSTEMS AND METHODS FOR ENHANCED END USER EXPERIENCE FOR PROTECTION STATUS OF BACKED UP DATA

(71) Applicant: Dell Products L.P., Round Rock, TX (US)

(72) Inventors: Shelesh Chopra, Bangalore (IN); Sunil Yadav, Bangalore (IN); Manish Sharma, Bangalore (IN); Aaditya Bansal, Bangalore (IN)

(73) Assignee: DELL PRODUCTS L.P., Round Rock, TX (US)

( * ) Notice: Subject to any disclaimer, the term of this patent is extended or adjusted under 35 U.S.C. 154(b) by 146 days.

This patent is subject to a terminal disclaimer.

(21) Appl. No.: 17/721,402

(22) Filed: Apr. 15, 2022

(65) Prior Publication Data

US 2023/0333940 A1 Oct. 19, 2023

(51) Int. Cl.
*G06F 11/14* (2006.01)
*G06F 16/16* (2019.01)

(52) U.S. Cl.
CPC ...... *G06F 11/1464* (2013.01); *G06F 11/1435* (2013.01); *G06F 11/1451* (2013.01); *G06F 11/1469* (2013.01); *G06F 16/164* (2019.01); *G06F 16/168* (2019.01)

(58) Field of Classification Search
CPC ............ G06F 11/1464; G06F 11/1435; G06F 11/1451; G06F 11/1469; G06F 16/164; G06F 16/169
See application file for complete search history.

(56) References Cited

U.S. PATENT DOCUMENTS

| | | | |
|---|---|---|---|
| 9,138,208 | B2 | 9/2015 | Linder et al. |
| 9,690,666 | B1 | 6/2017 | Shembavnekar et al. |
| 2001/0005846 | A1* | 6/2001 | Barney ............... G06F 16/10 |
| 2012/0102088 | A1 | 4/2012 | Bindal |
| 2014/0317459 | A1* | 10/2014 | Frank ............... G06F 11/0727 714/57 |
| 2018/0018234 | A1* | 1/2018 | Madiraju Varadaraju ............... G06F 16/162 |
| 2022/0043718 | A1* | 2/2022 | Sharma ............ G06F 11/1464 |
| 2023/0058573 | A1* | 2/2023 | Singh ............... G06F 3/04842 |

* cited by examiner

*Primary Examiner* — Tony Wu
(74) *Attorney, Agent, or Firm* — Chamberlain, Hrdlicka, White, Williams & Aughtry; Aly Z. Dossa

(57) ABSTRACT

A method for performing a backup includes: obtaining a file system backup metadata associated with a target file system of a target production host; processing the file system backup metadata to determine protected data and unprotected data in the target file system and protection failure details associated with the unprotected data; generating, using the protected data, the unprotected data, and the protection failure details associated with the unprotected data, a graphical user interface (GUI) specifying a protection status of the target file system; and displaying, on a display of a computing device and to a user, the GUI.

15 Claims, 7 Drawing Sheets

| Item | Protected (%) | Needs attention? |
|---|---|---|
| /Root | 80 | |
| /Root/F1 | 50 | Something is not accessible or locked in F1 |
| /Root/F1/F2 | 100 | No |
| /Root/F3 | 10 | Contains system files, so ok |
| /Root/F.txt | 0 | Urgent, this is important file |

Graphical User Interface (GUI) 700

SYSTEMS AND METHODS FOR ENHANCED END USER EXPERIENCE FOR PROTECTION STATUS OF BACKED UP DATA

BACKGROUND

As people increasingly rely on computing systems and devices to perform a plethora of tasks; the systems have become increasingly complex, and the opportunities for failure and/or loss of important data has also increased. To prevent loss of important data, performing a backup on the file system of a computing system is necessary to prevent loss of data if a system failure occurs or cyberattacks such as ransomware are directed towards the system. File system backups leverage a file-based backup philosophy to protect the underlying data. This underlying mechanism is leveraged not just to protect the file system on a host, but also to protect workflows in network attached storage.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

DETAILED DESCRIPTION

Figure 1:
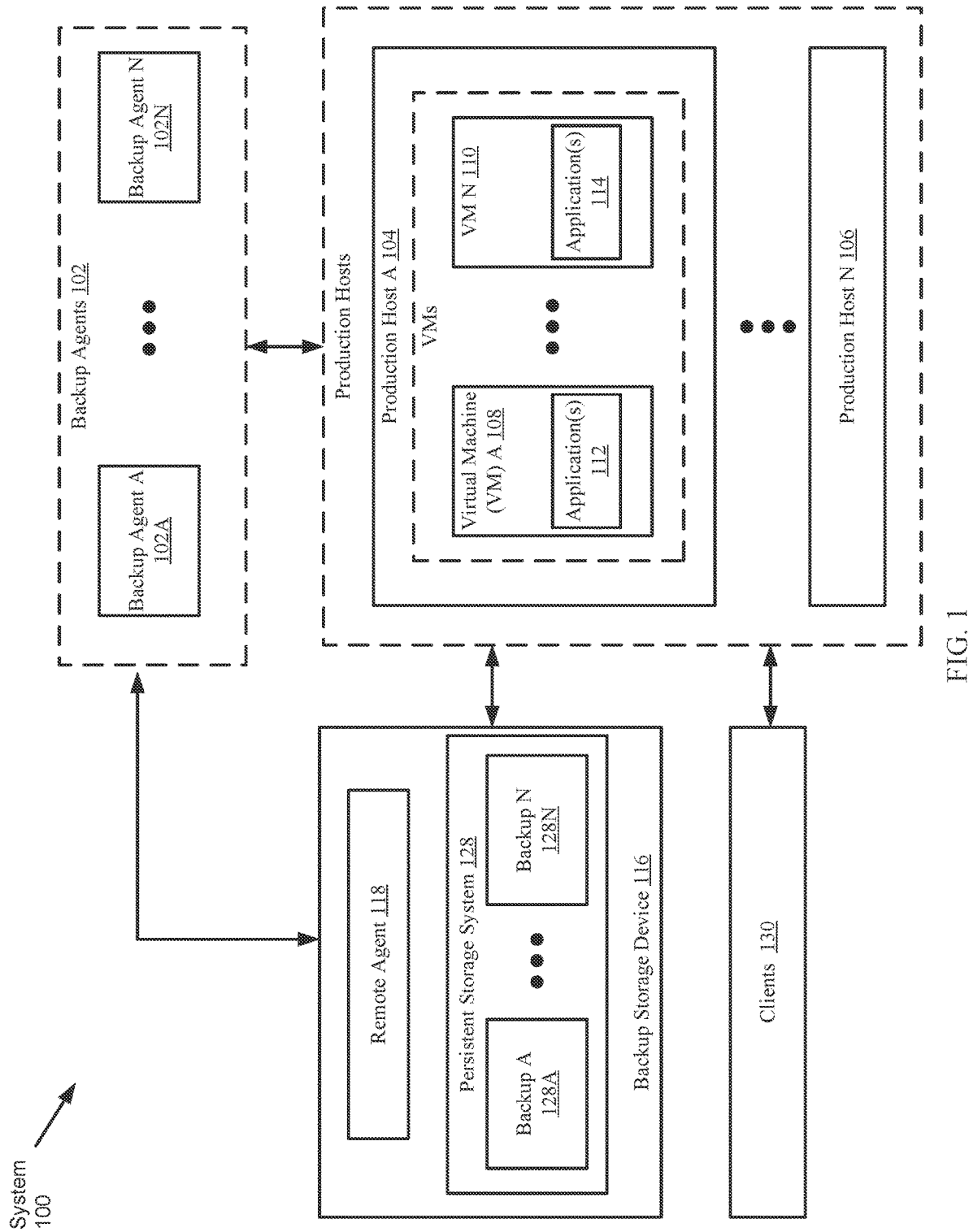
FIG. 1 shows a diagram of a system in accordance with one or more embodiments of the invention.

In the following description of the figures, any component described with regards to a figure, in various embodiments of the invention, may be equivalent to one or more like-named components described with regards to any other figure. For brevity, descriptions of these components will not be repeated with regards to each figure. Thus, every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regards to a corresponding like-named component in any other figure.

Throughout this application, elements of figures may be labeled as A to N. As used herein, the aforementioned labeling means that the element may include any number of items, and does not require that the element include the same number of elements as any other item labeled as A to N. For example, a data structure may include a first element labeled as A and a second element labeled as N. This labeling convention means that the data structure may include any number of the elements. A second data structure, also labeled as A to N, may also include any number of elements. The number of elements of the first data structure, and the number of elements of the second data structure, may be the same or different.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before," "after," "single," and other such terminology. Rather, the use of ordinal numbers is to distinguish between the elements. By way of an example, a first element is distinct from a second element, and the first element may encompass more than one element and succeed (or precede) the second element in an ordering of elements.

As used herein, the phrase operatively connected, or operative connection, means that there exists between elements/components/devices a direct or indirect connection that allows the elements to interact with one another in some way. For example, the phrase 'operatively connected' may refer to any direct connection (e.g., wired directly between two devices or components) or indirect connection (e.g., wired and/or wireless connections between any number of devices or components connecting the operatively connected devices). Thus, any path through which information may travel may be considered an operative connection.

In general, a backup (e.g., a full backup, an incremental backup, etc.) may include files and/or folders that are skipped for various reasons. Embodiments of the invention relate to methods and systems for cataloging and informing a user or administrator of those files and folders that have been skipped. More specifically, various embodiments of the invention may determine, after crawling a file system for performing a backup, that specific files and/or folders will not be backed up. The aforementioned information may be stored, e.g., in a file, as a list of files and/or folders that will not be backed up along with other meta-data. The file can be used to notify a user or administrator. This advantageously provides the user or administrator knowledge of gaps in the protection provided by a backup.

The following describes various embodiments of the invention.

FIG. 1 shows a diagram of a system in accordance with one or more embodiments of the invention. The system includes backup agents (102), production hosts (104)-(106), a backup storage device (116), a remote agent (118) and clients (130). The system may include additional, fewer, and/or different components without departing from scope of the invention. Each component may be operably connected to any of the other component via any combination of wired and/or wireless connections. Each component illustrated in FIG. 1 is discussed below.

In one or more embodiments of the invention, the backup agents (102A-102N) may generate and provide to the backup storage device (116) the backups and the historical meta-data based on backup policies implemented by the backup agent (102). The backup policies may specify a schedule in which the applications (e.g., 114) or other assets associated with the applications are to be backed up. The backup agent (102) may be triggered to generate a backup and historical meta-data and provide the backup and historical meta-data to the backup storage device (116) in response to a backup policy. Alternatively, backup, and historical meta-data may be generated by the backup agent (102) and provided to the backup storage device (116) in response to a backup request triggered by the client(s) (100). The backup request may specify the applications(s) (114) and/or assets associated with the applications (114) to be backed up.

In one or more embodiments of the invention, the backup agent (102) is a physical device. The physical device may include circuitry. The physical device may be, for example, a field-programmable gate array, application specific integrated circuit, programmable processor, microcontroller, digital signal processor, or other hardware processor. The physical device may be adapted to provide the functionality of the backup agent (102) described throughout this application.

In one or more embodiments of the invention, the backup agent (102) is implemented as computer instructions, e.g., computer code, stored on a persistent storage that when executed by a processor of the production hosts (104)-(106) causes the production hosts (104)-(106) to provide the functionality of the backup agents (102) described throughout this application.

In one or more embodiments of the invention, the production host (104)-(106), hosts one or more applications (112)-(114). In one or more embodiments of the invention, the application(s) (112)-(114) perform computer implemented services for clients (e.g., 130). Performing the computer implemented services may include performing operations on asset data that is stored in the production host (e.g., 104). The operations may include creating elements of assets, moving elements of assets, modifying elements of assets, deleting elements of assets, and other and/or additional operations on asset data without departing from the invention. The application(s) (112)-(114) and/or users of the client(s) (130) may include functionality for performing the aforementioned operations on the asset data in the production host (104)-(106). The application(s) (112)-(114) may be, for example, instances of databases, email servers, and/or other applications. The production host (104)-(106) may host other types of applications without departing from the invention.

In one or more of embodiments of the invention, the application(s) (112)-(114) is implemented as computer instructions, e.g., computer code, stored on a persistent storage that when executed by a processor(s) of the production hosts (104)-(106) cause the production host (104)-(106) to provide the functionality of the application(s) (112)-(114) described throughout this application.

The production hosts (104)-(106) may include physical storage or logical storage that will be discussed in more detail with regards to FIG. 2. The logical storage devices (e.g., virtualized storage) may utilize any quantity of hardware storage resources of any number of computing devices for storing data. For example, the persistent storage may utilize portions of any combination of hard disk drives, solid state disk drives, tape drives, and/or any other physical storage medium of any number of computing devices.

In one or more embodiments of the invention, the backup agents (102) may be a portion of the remote agents (118). The remote agents (118) and/or backup agents (102) may provide backup services to the production hosts (104)-(106). The backup services may include generation and storage of backups in the backup storage device (116). The backups services may also include restoration of the production hosts (104)-(106) using the backups stored in the backup storage device (116).

The remote agents (118) may provide backup services to the production hosts (104)-(106) by orchestrating: (i) generation of backups of the production hosts (104)-(106), (ii) storage of backups (128A)-(128N) of the production hosts (104)-(106) in the persistent storage system (128) of the backup storage device (116), (iii) consolidation of backup requests to reduce or prevent from generation of backups that are not useful for restoration purposes, and (iv) restoration of the production hosts (104)-(106) to previous states using backups (128A)-(128N) stored in the persistent storage system (128) of the backup storage device (116). The system may include any number of remote agents (e.g., 102A, 102N) without departing from the scope of the invention.

Additionally, to provide the backup services, the remote agent (118) may include functionality to generate and issue instructions to any component of the system of FIG. 1. In one or more embodiments, the remote agent (118) may also generate instructions in response to backup requests from other entities.

In one or more embodiments of the invention, the remote agent (118) may generate such instructions in accordance with backup schedules that specify when backups are to be generated. In one or more embodiments, a backup schedule may lay out specific points in time for a backup process to be performed.

In one or more embodiments of the invention, to satisfy the above-discussed backup schedules, the remote agent (118) may monitor a backup window (e.g., 4 hours, 8 hours, etc.) to perform a single backup and/or multiple backups. Additionally, the remote agent (118) may pause an ongoing backup if the backup exceeded the backup window. The remote agent (118) may then resume the paused backup while performing a next backup in a parallel manner based on the backup schedule.

In one or more embodiments of the invention, the backup storage device (116) may provide data storage services. For example, the backup storage device (116) may store backups of the production hosts (104)-(106) in persistent storage system (128). The persistent storage system (128) may also provide copies of the latest backup N (128N) previously stored backups (128A) of the production hosts (104)-(106). The system may include any number of backup storage devices (116) and backups (128A)-(128N) without departing from the scope of the invention.

Figure 5:
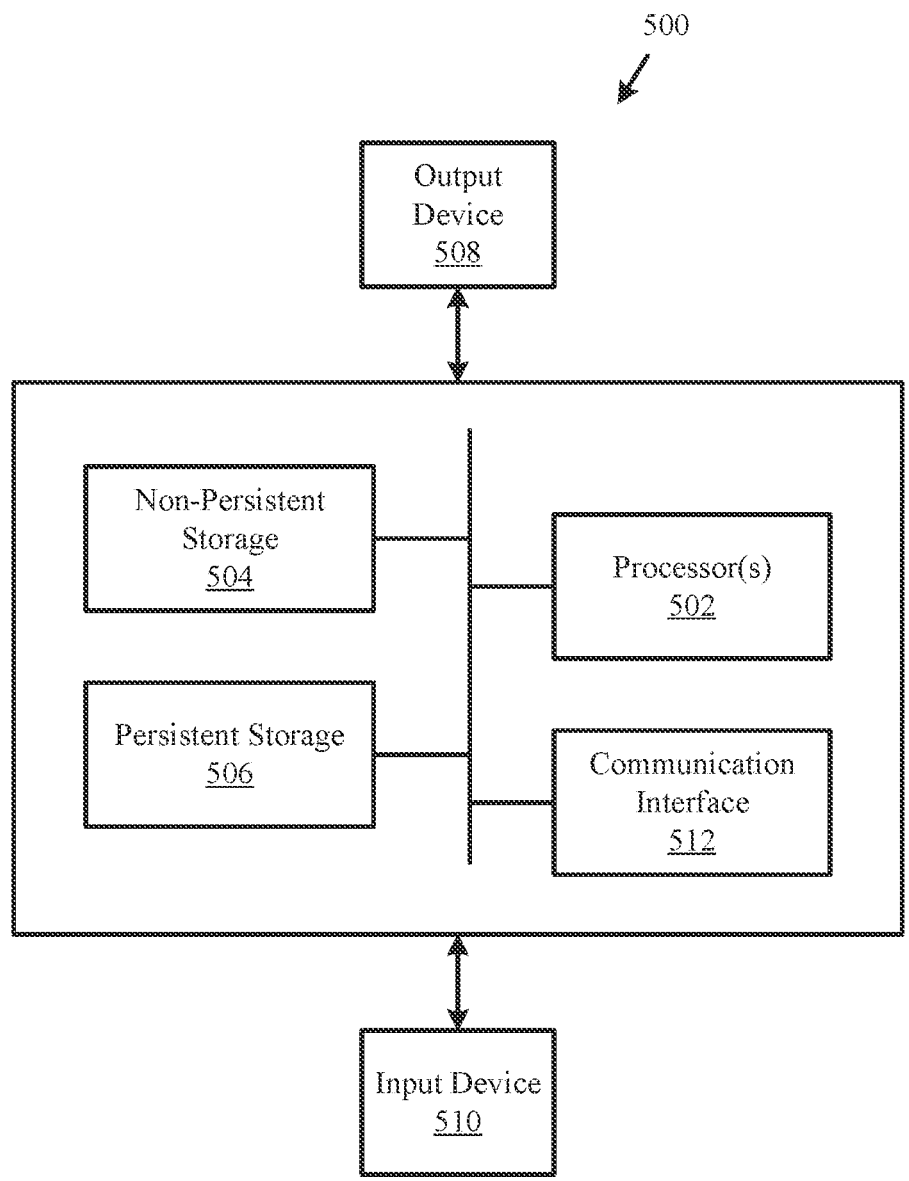
FIG. 5 shows a diagram of a computing device in accordance with one or more embodiments of the invention.

In one or more embodiments of the invention, the backup storage device (116) and persistent storage system (128) may be implemented as computing devices (e.g., 500, FIG. 5). A computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid-state drives, etc.). The computing device may include instructions, stored on the persistent storage, that when executed by the processor(s) of the computing device, cause the computing device to perform the functionality of the backup storage device (116) described throughout this application. Alternatively, in one or more embodiments of the invention, the backup storage devices (116) may also be implemented as logical devices, as discussed above.

In one or more embodiments of the invention, the production hosts (104)-(106) may provide services to the clients (130). For example, the production hosts (104)-(106) may host any number of applications that provide application services to the clients (130). Application services may include, but are not limited to database services, electronic communication services, instant messaging services, file storage services, etc.

In one or more embodiments of the invention, each of the production hosts (e.g., 104-106) may provide the above-discussed application services by hosting applications. Each of the production hosts may host any number of applications. Additionally, different production hosts may host the same number of applications or different numbers of applications. Different production hosts may also host similar or different applications.

In one or more embodiments of the invention, the production hosts (104)-(106) may host virtual machines (VMs, e.g., 108-110) that host the above-discussed applications. Each of the production hosts (104)-(106) may host any number of VMs that, in turn, host any number of applications.

In one or more embodiments of the invention, the production hosts (104)-(106) may perform portions of a backup process. For example, the production hosts (104)-(106) may initiate backups under the direction of the remote agent (118) or backup agents (102). In one or more embodiments, the production hosts (104)-(106) may include functionality to consolidate multiple backup generation requests so that duplicative backups are not generated, because the duplicative backups may not be useful for restoration purposes.

In one or more embodiments of the invention, the production hosts (104)-(106) may include functionality to initiate multiple backups in a parallel manner For example, the production hosts (104)-(106) may each host multiple backup processes that each manages the initiation of a respective backup. Each of the multiple backup processes may operate concurrently thereby causing multiple backups to be initiated in a parallel manner.

In one or more embodiments of the invention, the production hosts (104)-(106) may be implemented as computing devices (e.g., 500, FIG. 5). A computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid-state drives, etc.). The computing device may include instructions, stored on the persistent storage, that when executed by the processor(s) of the computing device, cause the computing device to perform the functionality of the production hosts (104)-(106) described throughout this application.

Alternatively, in one or more embodiments of the invention, the production hosts (104)-(106) may also be implemented as logical devices, as discussed above.

In one or more embodiments of the invention, the clients (130) may interact with the production hosts (104)-(106). For example, the clients (130) may utilize application services provided by the production hosts (104)-(106). When the clients (130) interact with the production hosts (104)-(106), data that is relevant to the clients (130) may be stored on the production hosts (104)-(106). For example, consider a scenario in which the production hosts (104)-(106) host a database utilized by the clients (130). In this scenario, the database may be a user database associated with the users of the clients (130). When a new user is identified, the clients (130) may add information regarding the new user to the database. By doing so, the data that is relevant to the clients (130) may be stored in the production hosts (104)-(106). This may be done because the clients (130) may desire access to the data regarding the new user at some point in time.

In one or more embodiments of the invention, the clients (130) may include functionality to use services provided by the production hosts (104)-(106). For example, the clients (130) may host local applications that interact with applications hosted by the production hosts (104)-(106).

In one or more embodiments of the invention, the clients (130) may be implemented as computing devices (e.g., 500, FIG. 5). A computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid-state drives, etc.). The computing device may include instructions, stored on the persistent storage, that when executed by the processor(s) of the computing device, cause the computing device to perform the functionality of the clients (130) described throughout this application.

Alternatively, in one or more embodiments of the invention, the clients (130) may also be implemented as logical devices, as discussed above.

Figure 2:
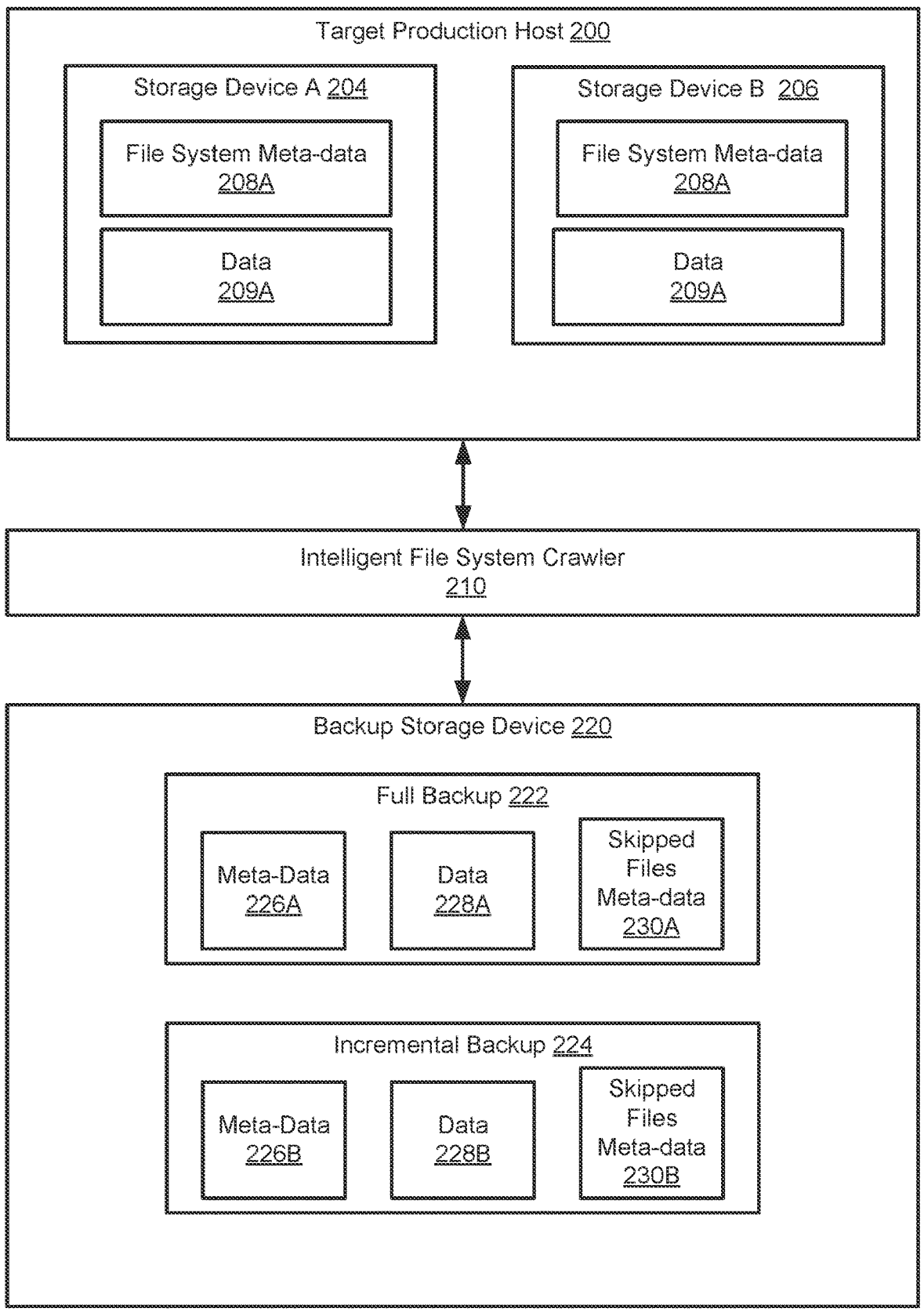
FIG. 2 shows a diagram of a backup system in accordance with one or more embodiments of the invention.

Turning now to FIG. 2, FIG. 2 shows a diagram of specific components utilized in performing a backup of a target production host (200) in accordance with one or more embodiments of the invention. The target production host (200) communicates with an intelligent file system crawler (210) and with a backup storage device (220). Each component illustrated in FIG. 2 is discussed below.

The target production host (200) may be similar to the production hosts (104)-(106) as discussed above in reference to FIG. 1. The production host (200) may include VMs, a hypervisor, a production agent, and storage devices (e.g., 204 and 206). The production host may include additional, fewer, and/or different components without departing from scope of the invention. Each component may be operably connected to any of the other component via any combination of wired and/or wireless connections.

As discussed above, the production host may provide computer implemented services to the client(s) (e.g., 130 in FIG. 1) and obtain backup storage services from the backup storage device (220). To provide and obtain the aforementioned computer implemented services and the backup storage services, the production host may include a backup agent (102), application(s) (112)-(114), and persistent storage (128). The production host may include other and/or additional components without departing from the invention.

The backup storage device (220) is the same or substantially similar to the backup storage device in FIG. 1. The backup storage device (220) stores a backup created at least in part by the intelligent file system crawler (210), which crawls the data in the target production host (200).

Target production host (200) include storage devices, e.g., 204, 206. The storage devices include a file system meta-data repository (208A) and data (209A). A file system meta-data repository (208A) may be one or more data structures that include information regarding applications stored in the file system repository. The information included in the file system meta-data repository (208A) may be used by the backup agent to generate backups and historical meta-data. The file system meta-data repository (208A) may include other and/or additional information without departing from the invention.

The file system meta-data repository, e.g., 208A and 208B, may include one or more data structures that may be used to generate backups of assets of a target file system of a target production host. The file system meta-data repository e.g., 208A and 208B, may include asset data generated by users of the application(s) (112)-(114) as discussed above. The asset data may be any type of data such as database data and email data generated by users of the application(s) (112)-(114) without departing from the invention. Each application of the application(s) (112)-(114) may include any number of assets, each asset may include any quantity of asset data, and furthermore, each asset may include any number of elements without departing from the invention. Users (e.g., clients (130)) may use the data, e.g., 209A and 209B, stored on the storage devices, e.g., 204 and 206, when obtaining computer implemented services from the target production host (200). Additionally, the target data, e.g., 209A and 209B, stored on the storage devices, e.g., 204 and 206, of the target production host (200), may be obtained by intelligent file system crawler (210) to generate backups. The data e.g., 209A and 209B, of the file system meta-data storage devices, e.g., 204 and 206, may be used by other and/or additional entities for other and/or additional purposes without departing from the invention.

In one or more embodiments of the invention, the backup agents (e.g., 102 FIG. 1) include an intelligent file system crawler (210) to obtain backups (e.g., 222 and 224) including meta-data, e.g., 226A and 226B, data, e.g., 228A and 228B, and skipped files meta-data, e.g., 230A and 230B, from the target file system of the target production host (200). The meta-data, data, and skipped files meta-data are stored in the backup storage device (220). The intelligent file system crawler (210) may also include the functionality to provide backups (e.g., 222 and 224), meta-data, e.g., 226A and 226B, and skipped files meta-data, e.g., 230A and 230B, to the production host (200, FIG. 2) for restoration purposes, history monitoring purposes, and/or other and/or additional purposes without departing from the invention. The intelligent file system crawler (210) may include other and/or additional functionalities without departing from the invention. In another embodiment of the invention, the file system crawler may be located on the production host.

The meta-data, e.g., 226A and 226B, and skipped files meta-data e.g., 230A and 230B, of the backups e.g., 222 and 224, may be one or more data structures that include historical information associated with each backup e.g., 222 and 224, and aspects of the application(s) (112 and 114, FIG. 1). The historical information may include a list of files and folders that have been skipped during crawling of the storage devices (204) and (206). This list may be stored in the skipped files meta-data e.g., 230A and 230B. Alternatively other storage areas including the meta-data e.g., 226A and 226B, or file system meta-data, e.g., 208A and 208B, may be used to store the lists of skipped files.

The skipped files meta-data e.g., 230A and 230B, includes a complete chronological history of files and/or folders that have been skipped. For each file and/or folder that has been skipped, the historical information may include when it was previously successfully backed up along with reason for its not being backed up such as, e.g., access denied or inaccessible. The data can be stored in the form of a table. An exemplary table is shown below.

TABLE 1

| Skipped Files | | | |
|---|---|---|---|
| Name | Is Protected | Last Backed up | Reason |
| F2 | No | Never | Access denied |
| N1 | No | Monday Feb. 7, 2022 | Inaccessible |
| N3 | No | Never | User-Excluded |

In the above Table, a file "F2" which has not been backed up, because access was denied. Further, a folder entry named "N1" was backed up on the February $7^{th}$ but not during the last backup because it has been inaccessible during backups since the February $7^{th}$. Further, a folder entry named "N3" has never been backed up as it was excluded from being backed up by the user. The invention is not limited to the aforementioned example. Further, the skipped file may include different and/or additional information without departing from the invention. Further, the skipped file may be organized in a different manner than shown in the above table without departing from the invention.

In one or more embodiments of the invention, the intelligent file system crawler (210) is a physical device. The physical device may include circuitry. The physical device may be, for example, a field-programmable gate array, application specific integrated circuit, programmable processor, microcontroller, digital signal processor, or other hardware processor. The physical device may be adapted to provide the functionality of the intelligent file system crawler (210) described throughout this application.

In one or more embodiments of the invention, the intelligent file system crawler (210) is implemented as computer instructions, e.g., computer code, stored on a persistent storage (220) that when executed by a backup agent (e.g., 102 of FIG. 1), causes a processor to provide the functionality of the intelligent file system crawler (210) described throughout this application.

In one or more embodiments of the invention, the backup storage device (220) stores data related to the backup. The data stored in backup storage device (220) may include backups of target data associated with applications of the target production host (200). The backup storage device (220) may store any quantity of backups without departing from the invention. The backup storage device (220) may store full backup (222) and incremental backup (224). The backup storage device (220) may store other and/or additional data without departing from the invention.

The backup storage device (220) may be implemented using physical storage devices and/or logical storage devices. The physical storage devices may include any combination of hard disk drives, solid state disk drives, tape drives, and/or any other physical storage mediums for the storage of data.

The logical storage devices (e.g., virtualized storage) may utilize any quantity of hardware storage resources of any number of computing devices for storing data. For example, the backup storage device (220) may utilize portions of any combination of hard disk drives, solid state disk drives, tape drives, and/or any other physical storage medium of any number of computing devices.

Figure 3:
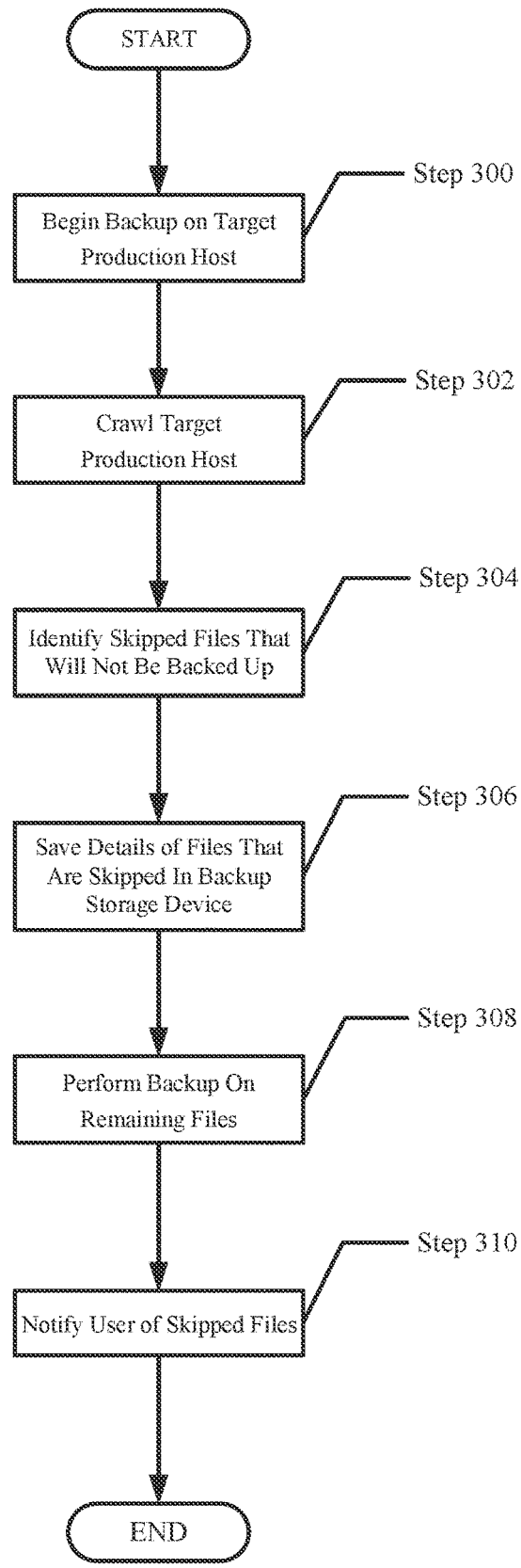
FIG. 3 shows a flowchart of a method of generating a backup in accordance with one or more embodiments of the invention.
Figure 4:
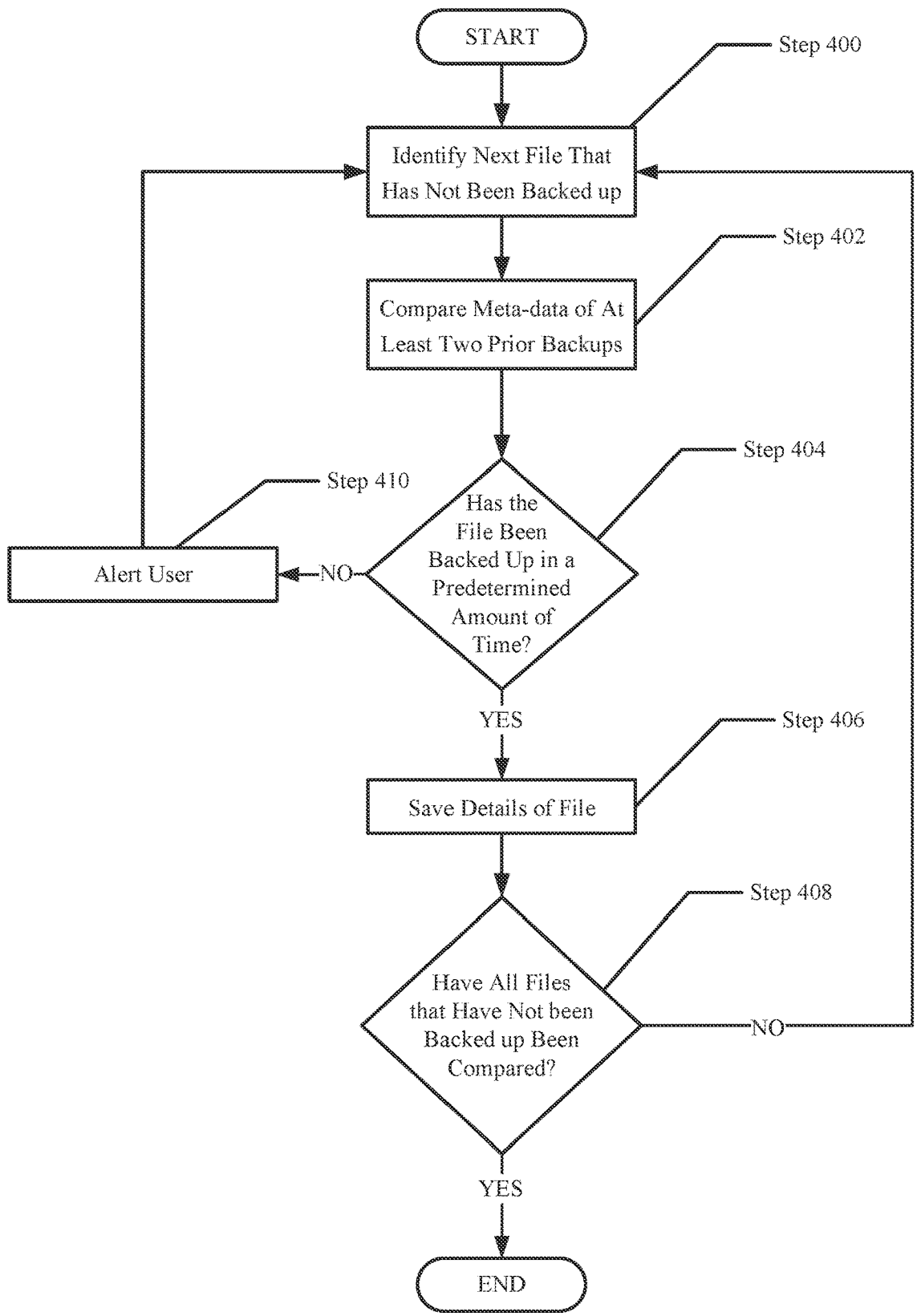
FIG. 4 shows a flowchart of a method of alerting a user if a file is not backed up over predetermined time in accordance with one or more embodiments of the invention.

FIGS. 3 and 4 show a method to perform a backup in accordance with one or more embodiments of the invention. While the various steps in the method are presented and described sequentially, those skilled in the art will appreciate that some or all the steps may be executed in different orders, may be combined, or omitted, and some or all steps may be executed in a parallel manner without departing from the scope of the invention.

FIG. 3 shows a flowchart of a method of generating a backup in accordance with one or more embodiments of the invention. The method may be performed by, for example, a backup agent (102, FIG. 1) and/or intelligent file system crawler (210, FIG. 2) of a production host (104-106, FIG. 1). Other components of the system illustrated in FIG. 1 and FIG. 2 may perform all, or a portion of the method of FIG. 3 without departing from the invention.

While FIG. 3 is illustrated as a series of steps, any of the steps may be omitted, performed in a different order, additional steps may be included, and/or any or all the steps may be performed in a parallel and/or partially overlapping manner without departing from the invention.

In step 300, the system begins a backup on the target production host (200, FIG. 2).

In one or more embodiments of the invention, the backup is started based on a backup generation event that is identified by the backup agent as point in time specified by a backup policy associated with the generation of a backup of a target or obtaining a message from a client requesting the generation of a backup of the target. In one embodiment, the backup agent may include a backup policy associated with the target that specifies points in time to generate backups of the target file system. The backup agent may monitor the backup policy and identify when a point in time specified by the backup policy occurs. The backup policy may include an identifier associated with the target corresponding with the backup policy. The identification of the point in time specified by the backup policy may result in the identification of the backup generation event by the backup agent. In another embodiment of the invention, a user of a client may send a message to the backup agent. The message may include a request to generate a backup of the target. The message may include an identifier associated with the target. The backup agent may identify obtaining the aforementioned message as the backup generation event. The backup generation event initiating a backup of a target may be identified via other and/or additional methods without departing from the invention.

In step 302, the backup agent causes the intelligent file system crawler (210 FIG. 2) to begin crawling the target production host and its file system (target file system).

In one or more embodiments of the invention an intelligent file system crawler which as described above is implemented in the backup agent or as a standalone agent/system for analyzing the contents of the target host's file system. The intelligent file system crawler analyzes each folder to determine if the folder and/or files within it are to be backed-up according to the policy and rules that generated the backup event. The intelligent file system crawler also determines if there are rules or other reasons that the file or folder cannot be backed up, which will be described in more detail with regards to step 304. The intelligent file system crawler can take other forms without deviating from the scope of the disclosed invention.

The intelligent file system crawler can identify each file or folder and assign an identification to the file or folder for comparison. The identification in one or more embodiments can take the form of a hash value that is based on the file or folders characteristics. The hash value can be calculated using known method for calculating a hash value such as, but not limited to, MD4, MD5, SHA-1, SHA-2, and SHA-3. The identification in one or more other embodiments be related file/folder names, complete path of the file/folder, and/or any other useful means for identifying them.

Based on the identification or other characteristics of the file or folder can determine whether a file is to be backed-up or skipped. Other details of the files and/or folders can be determined which will be written to the backup's meta-data and/or a separate file such as the skipped files meta-data, which will be discussed in more detail with regards to steps 304 and 306.

In step 304, based on the crawling of the target production host, folders and files that will not be backed up are determined.

As discussed above the intelligent file system crawler can determine if a file or folder is to be skipped. This may be based on the file or folder being contained in an exclusion list or exclusion filter made by the user/administrator or by some other process which identifies files that should not be retained in the backup system. A non-limiting example is excluding a file type that would take up too much storage and/or would serve little purpose during a recovery.

Other files and/or folders may be skipped due to permissions or access restrictions. For example, a file may be included in an access-control list (ACL) and require a permission to be accessed that the backup lacks for security reasons. Other reasons including current file or folder usage may also prohibit a backup being able to be performed on a file or folder. Other reasons for skipping a file or folder may be determined and/or stored without departing from the invention. Once it is determined that a file or folder will be skipped the method goes to step 306.

In step 306, the details of the files and/or folders that are skipped are stored in a separate file such as, but not limited to, the skipped files meta-data file (e.g., 230A, FIG. 2). The skipped files and/or folders may be stored in the form of a table such as shown in table 1 above. Alternatively, the skipped files and/or folders may be stored in a database or other format appropriate to include information on the skipped files and/or folders.

In one or more embodiments of the invention the skipped files and/or folders are stored in a skipped file meta-data file (e.g., 230A, FIG. 2), this may be a separate file or part of the backup metadata (e.g., 226A, FIG. 2). The file may be stored on the backup storage device (e.g., 220, FIG. 2) or elsewhere such as on the target production hose (e.g., 200, FIG. 2) or a client (e.g., 130, FIG. 1).

In one or more embodiments of the invention, the saved details of the skipped files and/or folders include information that can be used to determine if the file has previously been skipped and the reasons that is was skipped. This information can be used to generate an alert to a user or administrator based on preset criteria as will be discussed later with regards to FIG. 4. The saved details of the skipped files and folders can include, but is not limited to, such entries as hash values of the file path, last date of a successful backup, error codes, filter identifiers, non-inclusion reasons, the file or folders complete path, and other information that would be useful to the administrator or user requesting the backup to understand the protections that the backup is providing.

In step 308, the backup agent completes the backup up on the remaining files (those that were not skipped).

In one or more embodiments of the invention, the backup agent generates a backup, including meta-data associated with the backup, using the multiple change lists, and stores the backup and the historical meta-data in a backup storage of the backup storages. The backup can take the form of a full back up or an incremental backup. When performing the backup, the backup agent can use previous skipped files meta-data to determine files to try to include in the incremental backup. Other resources can be used for performing the backup such as backup meta-data and file system meta-data.

In step 310 then notifies the user or administrator information on the skipped files and/or folders. This can take place before, during, or after the backup is performed in step 308. If performed before, it would give the user/administrator the ability to change policies or settings on the backup to capture files and/or folders that were being skipped. If performed after the step may also include notifying the user/administrator that the backup has either completed successfully or as failed (along with any pertinent statics or explanations).

The notification can take any form that is useful to the user or administrator and is not limited to those described herein. The notification in step 310 can take the form of displaying a table similar to that of table 1 on a graphical user interface (GUI) of the client or other device's display. In other embodiments an alert would be provided on the GUI only when a condition is met as determined in the method of FIG. 4.

The method may end following step 310.

FIG. 4 shows a flowchart of a method of crawling the target production host and identifying files that have been skipped and alerting a user when the skipped files meet a predetermined threshold. The method may be performed by, for example, a backup agent (102, FIG. 1) and/or intelligent file system crawler (210, FIG. 2) of a production host (104-106, FIG. 1). Other components of the system illustrated in FIG. 1 and FIG. 2 may perform all, or a portion of the method of FIG. 4 without departing from the invention.

The method of FIG. 4 can be performed during step 304 of FIG. 3 or can be performed as a stand-alone process. In other one or more embodiments the method of FIG. 4 can be performed during steps other than 304 of FIG. 3. In one or more embodiments of the invention, the method of FIG. 4 is performed for each file/folder added to a skipped files meta-data (e.g., 230A or 230B of FIG. 2) or for every file/folder encountered by the intelligent file system crawler.

While FIG. 4 is illustrated as a series of steps, any of the steps may be omitted, performed in a different order, additional steps may be included, and/or any or all the steps may be performed in a parallel and/or partially overlapping manner without departing from the invention.

In step 400, the next file or folder that has not been backed up or is a skipped file is identified and considered according to the method of FIG. 4. The meta-data or other information concerning this file or folder is then considered in step 402.

In step 402 the meta-data (or other pertinent information obtained by the intelligent file system crawler or equivalent thereof), is compared with at least two prior backups. For example, if the current backup process is backup N (see e.g., 128N of FIG. 1), the metadata of the skipped file (which would be in the skipped files meta-data e.g., 230B of FIG. 2) would be compared to at least a backup M's skipped files meta-data. The previous backup may be the full backup (e.g., 222 of FIG. 2) or one or more incremental backups (e.g., 224 of FIG. 2).

The comparison can take the form of comparing the past backup metadata to determine the last time the file was backed up and in step 404 it is determined if the file was backed up in a predetermined amount of time or alternatively in a predetermined number of backups. The predetermined amount of time or number of backups can be set by a user or administrator when configuring the backups, alternatively the predetermined amount of time or number of backups can be determined by a data manager or other part of the hosts or clients. The predetermined amount of time or number of backups can be set on a per-file type basis (as a non-limiting example, all databases have to be backed up every 7 days, while emails must be backed up at least once a day), or on a universal basis (as a non-limiting example all files must be backed up every 14 days).

If the amount of time since the last backup of the file or folder is greater than the predetermined amount of time (which may be set by a user) or number of backups, the method proceeds to step 410, where the user or administrator is alerted or notified that the file or folder is not being backed up. In one or more embodiments of the invention, this can take the form of a single statement on the user or administrator's display that a file/folder has not been backed up for a specific amount of time. In one or more other embodiments of the invention, all files/folders that have not been backed up for the specific amount of time are displayed in the form of a chart which includes such information as when the last backup did occur (if ever) and any other information that the user or client deems is necessary.

Once the user or administrator is alerted in step 410, the method proceeds to step 406 and the next file that has not been backed up is identified.

While the alerting is described as occurring each a time a determination is made, the alerting may only occur after all of the files have been processed. In this manner, the user and/or administrator is not inundated with multiple alerts; rather, the user is only alerted once (or relatively few times).

Either following step 410 or 404, in step 406 the information regarding the skipped file or folder is saved to a file such as a skipped files meta-data (e.g., 230 of FIG. 2). Saving the information is discussed in more detail with the regards to step 306 in the method of FIG. 3. In one or more other embodiments of the invention, the saving of step 406 can be done in alternative files besides those described in regards to the method of FIG. 3. In yet another one more embodiment of the invention, the details of the files can be presented to a user or administrator.

Once the details of the file are saved or presented to a user or administrator in accordance with step 406, the method proceeds to step 408. In step 408 it is determined if all files that have not been backed up and/or skipped have been compared. If all files that have not been backed up and/or skipped have been compared then the method ends, otherwise the next file or folder is identified in step 400 and the method continues until in step 408 it is determined that all files and folders have been compared.

The method shown in FIG. 3 is used to identify gaps in data protection while the method shown in FIG. 4 may be further used to identify when specific files have not been backed up for an extended period of time. Said another way, FIG. 3 generates a list of what has not been backed up and why, while FIG. 4 further highlights skipped files that are outside a threshold range.

Additionally, as discussed above, embodiments of the invention may be implemented using computing devices. FIG. 5 shows a diagram of a computing device in accordance with one or more embodiments of the invention. The computing device (500) may include one or more computer processors (502), non-persistent storage (504) (e.g., volatile memory, such as random access memory (RAM), cache memory), persistent storage (506) (e.g., a hard disk, an optical drive such as a compact disk (CD) drive or digital versatile disk (DVD) drive, a flash memory, etc.), a communication interface (512) (e.g., Bluetooth interface, infrared interface, network interface, optical interface, etc.), input devices (510), output devices (508), and numerous other elements (not shown) and functionalities. Each of these components is described below.

In one embodiment of the invention, the computer processor(s) (502) may be an integrated circuit for processing instructions. For example, the computer processor(s) may be one or more cores or micro-cores of a processor. The computing device (500) may also include one or more input devices (510), such as a touchscreen, keyboard, mouse, microphone, touchpad, electronic pen, or any other type of input device. Further, the communication interface (512) may include an integrated circuit for connecting the computing device (500) to a network (not shown) (e.g., a local area network (LAN), a wide area network (WAN) such as the Internet, mobile network, or any other type of network) and/or to another device, such as another computing device.

In one embodiment of the invention, the computing device (500) may include one or more output devices (508), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (502), non-persistent storage (504), and persistent storage (506). Many distinct types of computing devices exist, and the input and output device(s) may take other forms.

One or more embodiments of the invention may be implemented using instructions executed by one or more processors of the data management device. Further, such instructions may correspond to computer readable instructions that are stored on one or more non-transitory computer readable mediums.

Figure 6:
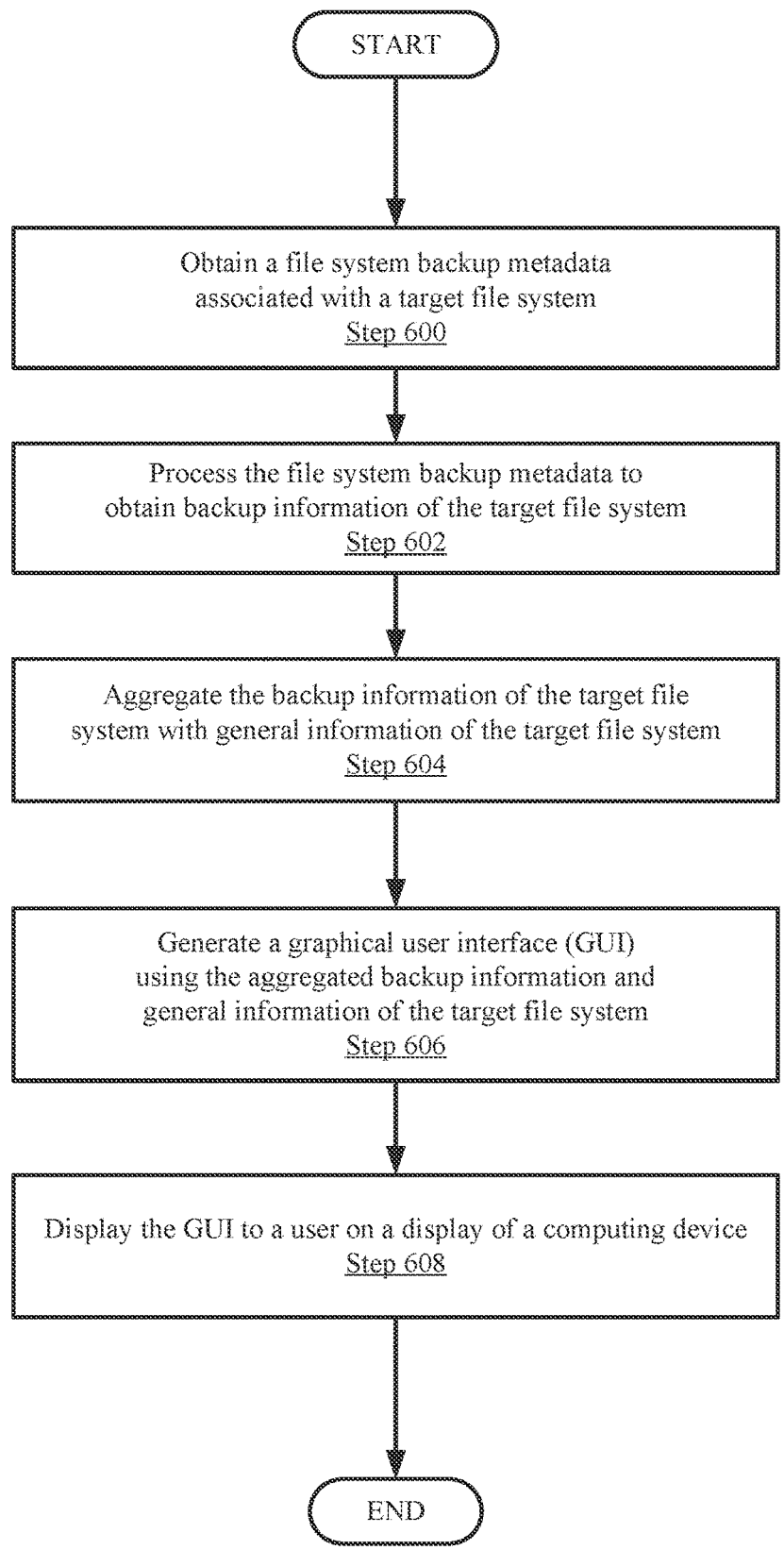
FIG. 6 shows a flow chart in accordance with one or more embodiments of the invention.

Turning now to FIG. 6, FIG. 6 shows a flowchart of a method in accordance with one or more embodiments of the invention. The method depicted in FIG. 6 may be performed to generate a graphical user interface (GUI) showing a protection status of each file/folder/data of a target file system that was backed up using the process discussed above in reference to FIG. 3. The method shown in FIG. 6 may be performed by any combination of the devices (e.g., the intelligent file system crawler (210) of the backup agents (102) and/or any of the clients (130), etc.) as shown in FIGS. 1 and 2.

While FIG. 6 is illustrated as a series of steps, any of the steps may be omitted, performed in a different order, additional steps may be included, and/or any or all of the steps may be performed in a parallel and/or partially overlapping manner without departing from the invention. Additionally, steps in FIG. 6 shown using broken lines may be optional steps within the method.

Initially, in Step 600, a file system backup metadata associated with a target file system is obtained. In one or more embodiments, the target file system may be the same target file system discussed above in Step 302 of FIG. 3. Additionally, the file system backup metadata may include, but is not limited to: the skipped file meta-data file (e.g., 230A, FIG. 2); and the backup metadata (e.g., 226A, FIG. 2).

In Step 602, the file system backup metadata is processed to obtain backup information of the target file system. In one or more embodiments, the backup information of the target file systems may include, for example, but is not limited to: information specifying each file/folder/data in the target file system as protected data (e.g., successfully backed up data) or unprotected data (e.g., data that are not yet (or failed to be) backed up); and protection failure information associated with the unprotected data. In one or more embodiments, the protection failure information may specify one or more reasons why a certain file/folder/data is not backed up. Examples of the protection failure information is shown above in Table 1 as information specified in the "Reason" column.

In Step 604, the backup information of the target file system is aggregated with general information of the target file system. In one or more embodiments, the general information of the target file system may include general details (e.g., a name, a path, a creation date, a size, a file/folder/data hierarchy, etc.) of one or more files/folders/data stored in the target file system.

In Step 606, a graphical user interface (GUI) is generated using the aggregated backup information and general information of the target file system. In one or more embodiments, using the aggregated backup information and general information of the target file system, the GUI may specify a protection status of each of the files/folders/data stored in the target file system.

In one or more embodiments, the protection status may specify a protection percentage of the protected data in the target file system. This protection percentage may be calculated using the information specifying each file/folder/data in the target file system as protected data (e.g., successfully backed up data) or unprotected data (e.g., data that are not yet (or failed to be) backed up) from the backup information obtained in Step 602. For example, assume that the target file system includes 10 files and that 6 out of the 10 files are protected. The protection percentage of the protected data in the target file system would be calculated as 60%.

In one or more embodiments, in the event that the target file system includes one or more folders each including one or more sub-folders, the protection percentage of the protected data of each folder/file/data may also be calculated using the backup information obtained in Step 602. An example of this is shown below in reference with FIG. 7. This advantageously provides users with a level of granularity that allows the user to determine how much of their file/folders are protected at different levels of the target file system.

In one or more embodiments, the protection failure information associated with each file/folder/data of the target file system may also be presented on the GUI. In one or more embodiments, while generating the GUI, the protection failure information may be used to generate one or more recommendations for addressing each of the unprotected data. These recommendations may also be included in the GUI along with the protection failure information. An example of a combination of the protection failure information and recommendations are shown below in reference to FIG. 7.

In Step 608, the GUI is displayed to a user on a display of the user's computing device (e.g., an edge device; the client 130 of FIG. 1). More specifically, in one or more embodiments, the backup agents (e.g., 102, FIG. 1) in which the intelligent file system crawler is included may transmit instructions to the user's computing device to instruct the user's computing device to display the GUI on a display. This advantageously allows users (whose computing devices are on the edge of the network on which the backup system (e.g., system 100, FIG. 1) is instantiated) to obtain a more detailed understanding of how their data (e.g., files/folder/data) is being protected by the backup system.

Figure 7:
FIG. 7 shows an implementation example in accordance with one or more embodiments of the invention.

FIG. 7 shows an implementation example in accordance with one or more embodiments. More specifically, FIG. 7 shows an example GUI generated in above-discussed Step 606 of FIG. 6. One of ordinary skill in the art would appreciate that the GUI should not be limited to the format shown in FIG. 7, and that the GUI may be shown in any format/form without departing from the scope of one or more embodiments disclosed herein.

Beginning of Example

As shown in FIG. 7, a GUI (700) is generated to show a protection status of each file/folder/data (e.g., also referred to as "items" in FIG. 7) of the target file system. More specifically, the GUI (700) of FIG. 7 shows that the target file system includes a folder "/Root" that includes multiple sub-folders ("/Root/F1", "Root/F1/F2", and Root/F3) and at least one file "Root/F.txt". Although not shown, each sub-folder may also include one or more individual files.

As further shown in the GUI (700) of FIG. 7, a protection percentage is provided for each item. This protection percentage specifies how much of a file/folder/data is protected (e.g., successfully backed up). For example, as shown in FIG. 7, 0% of the "Root/F.txt" file is protected. Additionally, FIG. 7 also shows that 80% of the entire "/Root" folder is protected based on the protection percentage of each respective sub-folder and file included in the "/Root" folder.

Finally, each item in the GUI (700) of FIG. 7 is provided with a "Needs Attention" column. This "Needs Attention" column includes the combination of the combination of the protection failure information and recommendations as discussed above in Step 606 of FIG. 6. For example, with respect to the "Root/F.txt" file that is 0% protected (e.g., 0% backed up), the "Needs Attention" column indicates that this file in important and needs to be urgently backed-up (e.g., protected). Although not shown in the GUI (700), the reason(s) why the "Root/F.txt" file is 0% backed up may also be provided in the "Needs Attention" column.

End of Example

One or more embodiments of the invention may improve the operation of one or more computing devices. More specifically, embodiments of the invention relate to generating backups of applications. The user or administrator that monitors the backup is notified of those files and/or folders that have not been backed up in the most recent backup. Further, embodiments of the invention enable alerts to be initiated when a particular file or folder has not been backed up over multiple backups or over a predetermined period. As a result, the user or administrator can have a better understanding of the protection and lack of protection that the present backups are providing.

Thus, embodiments of the invention may address the problem of skipped files and folders when performing a backup. This problem arises due to the technological nature of the specific applications that are being backed up.

The problems discussed above should be understood as being examples of problems solved by embodiments of the invention disclosed herein and the invention should not be limited to solving the same/similar problems. The disclosed invention is broadly applicable to address a range of problems beyond those discussed herein.

While the invention has been described with respect to a limited number of embodiments, those skilled in the art, having benefit of this disclosure, will appreciate that other embodiments can be devised which do not depart from the scope of the technology as disclosed herein. Accordingly, the scope of the invention should be limited only by the attached claims.

What is claimed is:

1. A method for performing a backup, the method comprising:
    beginning a backup on a target production host, based on a backup generation event;
    crawling, by an intelligent file system crawler, a target file system of the target production host, wherein the intelligent file system crawler identifies each file and assigns to each file a hash value based on characteristics of each file;
    identifying, based on the crawling, files that will not be backed up based on the hash value of the files;
    storing details of the files that will not be backed up to a separate file, wherein the separate file is a file system backup metadata;
    notifying, using the separate file, a user of the files that will not be backed up;
    performing the backup of remaining files, wherein the remaining files are not listed in the separate file;
    after performing the backup of the remaining files:
        obtaining the file system backup metadata associated with the target file system of the target production host;
        processing the file system backup metadata to determine:
            protected data and unprotected data in the target file system, and
            protection failure information associated with the unprotected data, wherein the protection failure information comprises historical information generated by determining whether each file of the unprotected data was inaccessible during a backup, was denied access during the backup, or was excluded by a user from the backup;
        generating, using the protected data, the unprotected data, and the protection failure information associated with the unprotected data, a graphical user interface (GUI) specifying a protection status of the target file system and a recommendation for addressing the unprotected databased on the protection failure information; and
        displaying, on a display of a computing device and to the user, the GUI.

2. The method of claim 1, wherein the files that will not be backed up are the unprotected data of the target file system and the remaining files that are backed up are the protected data of the target file system.

3. The method of claim 1,
    wherein the target file system comprises a folder comprising a subfolder, and
    wherein processing the file system backup metadata further comprises:
        determining an amount of the protected data and the unprotected data in the folder; and
        determining the amount of the protected data and the unprotected data in the subfolder.

4. The method of claim 1,
    wherein the target file system comprises a folder comprising a subfolder,
    wherein the GUI includes a first entry for the folder and second entry for the subfolder, and
    wherein the method further comprises:
        determining that an unprotected file of the target file system is in the subfolder; and
        while generating the GUI, associating the protection failure information associated with the unprotected data of the subfolder with the second entry such that the protection failure information is displayed on the GUI as part of the second entry.

5. The method of claim 3, wherein the protection status of the target file system comprises:
first information specifying a protection percentage of the protected data in the folder,
wherein the first information is obtained using the amount of the protected data and the unprotected data determined in the folder, and
second information specifying the protection percentage of the protected data in the subfolder,
wherein the second information is obtained using the amount of the protected data and the unprotected data determined in the subfolder.

6. A non-transitory computer readable medium (CRM) comprising computer readable program code, which when executed by a computer processor enables the computer processor to perform a method for performing a backup, the method comprising:
beginning a backup on a target production host, based on a backup generation event;
crawling, by an intelligent file system crawler, a target file system of the target production host, wherein the intelligent file system crawler identifies each file and assigns to each file a hash value based on characteristics of each file;
identifying, based on the crawling, files that will not be backed up based on the hash value of the files;
storing details of the files that will not be backed up to a separate file, wherein the separate file is a file system backup metadata;
notifying, using the separate file, a user of the files that will not be backed up;
performing the backup of remaining files, wherein the remaining files are not listed in the separate file;
after performing the backup of the remaining files:
obtaining the file system backup metadata associated with the target file system of the target production host;
processing the file system backup metadata to determine:
protected data and unprotected data in the target file system, and
protection failure information associated with the unprotected data, wherein the protection failure information comprises historical information generated by determining whether each file of the unprotected data was inaccessible during a backup, was denied access during the backup, or was excluded by a user from the backup;
generating, using the protected data, the unprotected data, and the protection failure information associated with the unprotected data, a graphical user interface (GUI) specifying a protection status of the target file system and a recommendation for addressing the unprotected databased on the protection failure information; and
displaying, on a display of a computing device and to the user, the GUI.

7. The non-transitory CRM of claim 6, wherein the files that will not be backed up are the unprotected data of the target file system and the remaining files that are backed up are the protected data of the target file system.

8. The non-transitory CRM of claim 6, wherein the target file system comprises a folder comprising a subfolder, and wherein processing the file system backup metadata further comprises:
determining an amount of the protected data and the unprotected data in the folder; and
determining the amount of the protected data and the unprotected data in the subfolder.

9. The non-transitory CRM of claim 6,
wherein the target file system comprises a folder comprising a subfolder,
wherein the GUI includes a first entry for the folder and second entry for the subfolder, and
wherein the method further comprises:
determining that an unprotected file of the target file system is in the subfolder; and
while generating the GUI, associating the protection failure information associated with the unprotected data of the subfolder with the second entry such that the protection failure information is displayed on the GUI as part of the second entry.

10. The non-transitory CRM of claim 8,
wherein the protection status of the target file system comprises:
first information specifying a protection percentage of the protected data in the folder,
wherein the first information is obtained using the amount of the protected data and the unprotected data determined in the folder, and
second information specifying the protection percentage of the protected data in the subfolder,
wherein the second information is obtained using the amount of the protected data and the unprotected data determined in the subfolder.

11. A system comprising:
a memory; and
a processor comprising an intelligent file system crawler, the processor coupled to the memory, wherein the processor is configured to execute a method for performing a backup comprising:
beginning a backup on a target production host, based on a backup generation event;
crawling, by the intelligent file system crawler, a target file system of the target production host, wherein the intelligent file system crawler identifies each file and assigns to each file a hash value based on characteristics of each file;
identifying, based on the crawling, files that will not be backed up based on the hash value of the files;
storing details of the files that will not be backed up to a separate file, wherein the separate file is a file system backup metadata;
notifying, using the separate file, a user of the files that will not be backed up;
performing the backup of remaining files, wherein the remaining files are not listed in the separate file;
after performing the backup of the remaining files:
obtaining the file system backup metadata associated with the target file system of the target production host;
processing the file system backup metadata to determine:
protected data and unprotected data in the target file system, and
protection failure information associated with the unprotected data, wherein the protection failure information comprises historical information generated by determining whether each file of the unprotected data was inaccessible during a backup, was denied access during the backup, or was excluded by a user from the backup;

generating, using the protected data, the unprotected data, and the protection failure information associated with the unprotected data, a graphical user interface (GUI) specifying a protection status of the target file system and a recommendation for addressing the unprotected data based on the protection failure information; and displaying, on a display of a computing device and to the user, the GUI.

12. The system of claim 11, wherein the files that will not be backed up are the unprotected data of the target file system and the remaining files that are backed up are the protected data of the target file system.

13. The system of claim 11, wherein the target file system comprises a folder comprising a subfolder, and wherein processing the file system backup metadata further comprises:

determining an amount of the protected data and the unprotected data in the folder; and determining the amount of the protected data and the unprotected data in the subfolder.

14. The system of claim 11, wherein the target file system comprises a folder comprising a subfolder, wherein the GUI includes a first entry for the folder and second entry for the subfolder, and wherein the method further comprises:

determining that an unprotected file of the target file system is in the subfolder; and while generating the GUI, associating the protection failure information associated with the unprotected data of the subfolder with the second entry such that the protection failure information is displayed on the GUI as part of the second entry.

15. The system of claim 13, wherein the protection status of the target file system comprises:

first information specifying a protection percentage of the protected data in the folder, wherein the first information is obtained using the amount of the protected data and the unprotected data determined in the folder, and second information specifying the protection percentage of the protected data in the subfolder, wherein the second information is obtained using the amount of the protected data and the unprotected data determined in the subfolder.

* * * * *